Aug. 11, 1953  D. MILLER, JR  2,648,439
FILTER BOTTOM

Filed Nov. 1, 1950  2 Sheets-Sheet 1

DURANDO MILLER, JR.
INVENTOR.

BY
his attorney

Aug. 11, 1953 D. MILLER, JR 2,648,439
FILTER BOTTOM
Filed Nov. 1, 1950 2 Sheets-Sheet 2

DURANDO MILLER, JR.
INVENTOR.

Patented Aug. 11, 1953

2,648,439

UNITED STATES PATENT OFFICE 2,648,439

FILTER BOTTOM

Durando Miller, Jr., Pelham Manor, N. Y., assignor to The Permutit Company, New York, N. Y., a corporation of Delaware Application November 1, 1950, Serial No. 193,457

4 Claims. (Cl. 210—124)

The invention relates to improvements in filter bottoms as more fully described hereinafter and as claimed.

In apparatus in which water or other liquids are treated by downward flow through a granular bed of material a so-called filter bottom is employed to collect the treated liquid, as well as the regenerative waste liquids in the event that the apparatus is used in carrying out ion exchange reactions. The filter bottom also serves to distribute the water or other liquid periodically passed through the bed in an upward direction for cleansing purposes, termed backwashing.

While many different types of filter bottom have been proposed, there is still room for improvement. Any maintenance work on a filter bottom is cumbersome and costly as it is generally necessary to shut the apparatus down and remove all material from it before the filter bottom becomes accessible. It is desirable, therefore, to avoid the need for maintenance or repair work on the filter bottom by choosing materials of construction not subject to corrosion or other deterioration, and by providing the passages of the filter bottom with smooth walls and avoiding stagnant spaces in which sediment and other matter might collect.

The objects of this invention are to provide a filter bottom in which the spaces occupied by liquid are held to a minimum and have smooth walls, in which contact of the liquid with metals is avoided, which can be constructed easily and economically and which once completed will be free of maintenance work. The manner in which these objects are achieved is shown in the appended drawings in which.

In the drawings like numerals refer to like parts throughout the several views.

Figure 1:
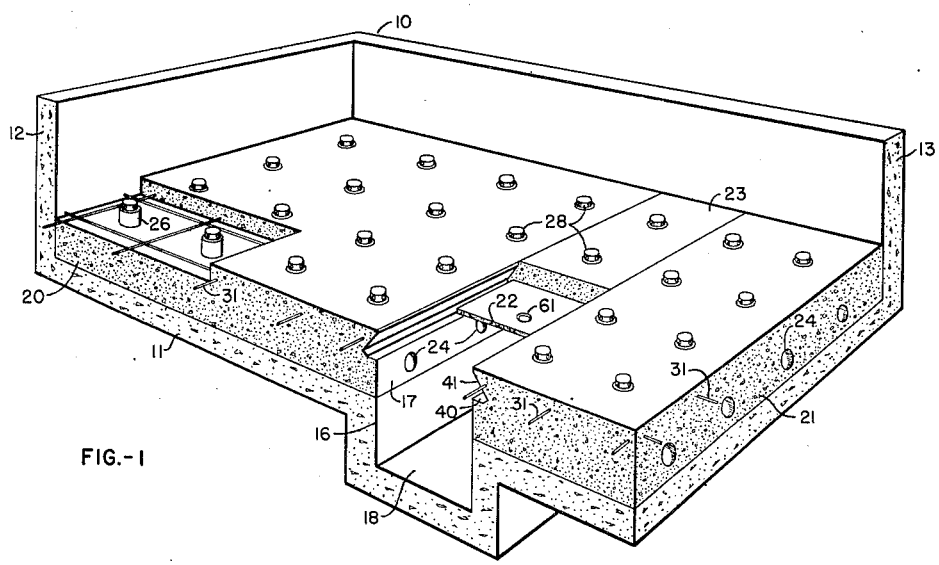
Fig. 1 is a perspective view, partly in cross-section, of a concrete filter tank embodying my novel filter bottom.

Fig. 1 shows a rectangular concrete filter tank 10 having a bottom 11 and sides 12 and 13. The remaining two sides and part of the bottom are broken away to show the construction more clearly. In the bottom 11, and preferably along one of its center lines is formed a trench 16 which in the completed structure, together with the enclosed space 17 lying thereabove, forms the header 18 for the underdrain. The header 18 communicates with a wall fitting 19 imbedded in wall 13 to which piping and valve means (not shown) are connected in a well-known manner.

Figure 2:
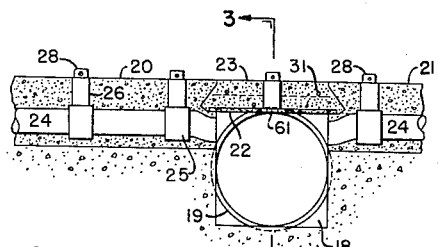
Fig. 2 is a fragmentary view, in cross-section along line 2—2 of Fig. 3, showing the central portion of the bottom of Fig. 1.
Figure 3:
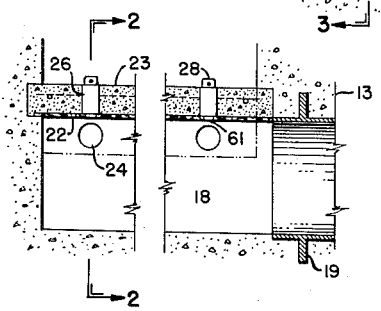
Fig. 3 is a fragmentary view, in cross-section along line 3—3 of Fig. 2.
Figure 7:
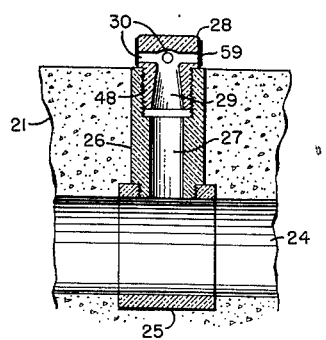
Fig. 7 is a fragmentary view, in cross-section along line 7—7 of Fig. 4, on an enlarged scale.

The filter bottom according to my invention comprises two monolithically cast concrete slabs 20 and 21 resting on the tank bottom 11 and a covering portion for the header 18 consisting of a plate 22, advantageously made of asbestos cement, and a concrete slab 23. In each of the slabs 20 and 21 is a plurality of equidistantly cast passages 24 opening into the header 18 and forming laterals for the filter bottom. Along each of the passages 24 is placed a plurality of rings 25 made of short sections of asbestos cement pipe or a ceramic material with an internal diameter substantially equal to the diameter of the passages 24. Into each ring 25 is screwed a porcelain ferrule 26 with a passage 27 (see Fig. 7) into which, in turn, is screwed a porcelain strainer 28 having a central passage 29 and four lateral passages 30 which are located in a horizontal plane above but closely adjacent to the top surface of the slabs 20 and 21, respectively. Similar ferrules 26 are screwed into the plate 22; they extend through the slab 23 and likewise carry at their tops strainers 28 (see Figs. 2 and 3). For greater strength each of the slabs 20, 21 and 23 has imbedded therein steel rods 31, and stirrups 32 are imbedded in the concrete structure in such manner as to anchor the slabs 20 and 21 to the tank bottom 11 (see Figs. 6).

The spacing of the strainers along the passages 24 and along the plate 22 is advantageously made equidistant with the spacing between adjacent passages 24, resulting in a filter bottom with strainers that are uniformly and equally spaced apart along both the width and the length of the filter.

Figure 4:
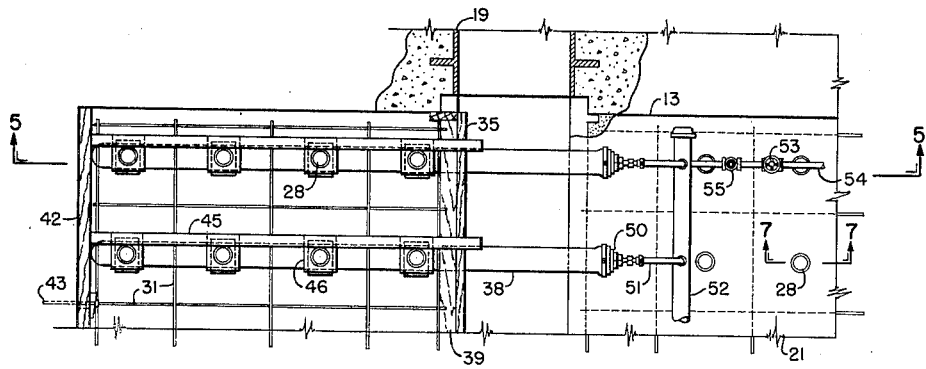
Fig. 4 is a fragmentary plan view of a filter bottom in accordance with my invention in the process of construction.
Figure 5:
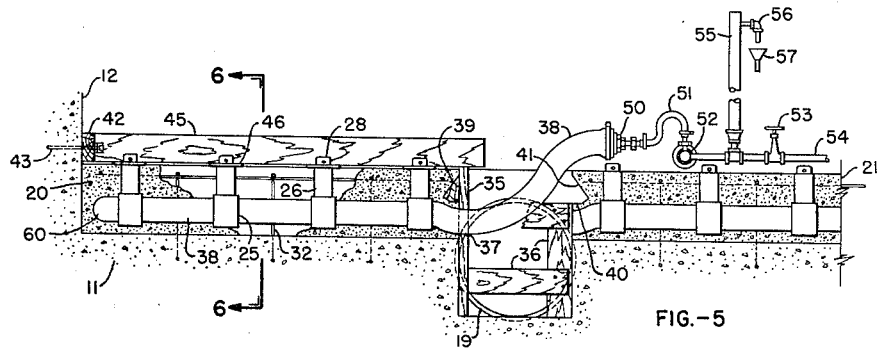
Fig. 5 is a view, partly in cross-section along line 5—5 of Fig. 4.
Figure 6:
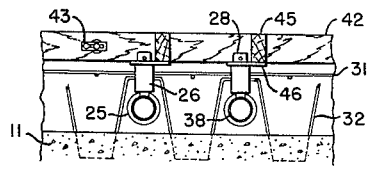
Fig. 6 is a view, partly in cross-section along line 6—6 of Fig. 5.

The method by which a filter bottom according to my invention is constructed will now be described with particular reference to Figs. 4, 5 and 6. First, the tank 10 is made with the stirrups 32 partly imbedded in the bottom 11. Then the slabs 20 and 21 are made, one at a time. Figs. 4 and 5 show the slab 21 completed and the slab 20 in the process of construction.

A board 35 is placed in the trench 16 and supported by braces 36. The board 35 has holes 37 therein through which rubber hoses 38 are passed and threaded through rings 25. Attached to the board 35 is a wedge shaped piece 39 which forms the shelf 40 on which the plate 22 rests and the undercut 41 which serves to anchor the slab 23 to slabs 20 and 21. To the side wall 12 is attached a stringer 42 by means of wall ties 43. The steel rods 31 are placed in the tank and supported by wiring them to the stirrups 32 and to each other. Then beams 45 are placed and supported on the boards 35 and stringers 42. Each of the beams has nailed thereto a suitable number of plywood support plates 46, each having a hole through which the shank 48 of a strainer 28 is passed and screwed into the ferrule 26 which in turn is screwed into a ring 25. In this manner the strainers 28 serve to rigidly hold the ferrules 26 in their predetermined locations and also serve, by means of rings 25, to hold the hoses 38 at a predetermined distance below the strainers 28.

Each of the hoses 38, by means of connectors 50 and tubing 51, is connected to a manifold 52 which, through a valve 53 and pipe 54, is connected to a pressure water supply. A stand pipe 55 is connected to pipe 54 between valve 53 and manifold 52. Near its upper end the stand pipe 55 is provided with an overflow 56 which is adapted to discharge into a funnel 57 connected with a point of disposal (not shown).

The hoses 38 are made of soft rubber with closed ends as shown at 60. Their outside diameter is somewhat less than the desired inside diameter of the passages 24. For example, for a passage diameter of three inches a hose 38 is selected which has an outside diameter of about two and one-half inches with walls made of soft rubber about one-eighth inch thick.

With the hoses 38 installed as described above the valve 53 is opened to admit water through pipe 54 into the manifold 52, tubing 51 and connectors 50 into the hoses 38, as well as into the stand pipe 55. There will be some air trapped in the hoses 38 when the system is filled with water under pressure, but since such air remains and is compressed in the hoses 38 it does not affect the pressure maintained by the head of water in the stand pipe 55 and is, therefore, of no consequence. When the system has thus been filled water will run from overflow 56 into the funnel 57 to waste. Valve 53 is now throttled to a point where a small flow to waste is maintained to insure that the stand pipe 55 remains filled with water up to the level of the overflow 56 which, for the type of hose 38 described above, is placed at an elevation of about nine feet above the level in which the top surface of the slab will be formed. Thus a pressure corresponding to a head of water somewhat in excess of nine feet of water is maintained in the hoses 38. This pressure will cause the hoses 38 to expand—in the example given increasing the outside diameter from two and one-half to slightly more than three inches—so that they now fit snugly in the rings 25 and holes 37. After masking tape 59 (see Fig. 7) has been wrapped around the strainers 28 to cover the passages 30 and so prevent the entry of concrete the structure is now ready for pouring.

The concrete is placed with an "elephant trunk" or chute as evenly as possible, taking care that too large a quantity is not dumped in one area as this might pinch or dislodge the hoses 38 or bury the strainers 28. After appropriate puddling to distribute the concrete evenly and prevent voids the surface is troweled or float finished to a level flush with the under side of the support plates 46. After allowing the concrete to cure for two to three days the hoses are deflated by draining off the water in stand pipe 55. They are then removed with care. If the concrete adheres to the hoses 38 they are readily freed by twisting them in one direction. Next, the strainers 28 are unscrewed. Then the forms and supports are removed, including beams 45 with support plates 46, stringer 42, braces 36 and board 35 with wedge-shaped piece 39; by avoiding damage to these parts during removal they may subsequently be used for constructing additional slabs. The strainers 28 are then screwed back into the ferrules 26.

After slabs 20 and 21 have been completed in this manner the trench 16 is covered to form the header 18. To this end plates 22 are laid on the shelves 40 and ferrules 26 with strainers 28 are screwed into holes 61 in the plates 22. After placing the steel rods 31 the concrete for slab 23 is poured as described above, puddled, and troweled or float finished even with the top surfaces of slabs 20 and 21. This completes the filter bottom which, upon curing and removal of the masking tape 59 from the strainers 28 is ready for use.

In use, graded layers of gravel are placed into the tank 10 which in turn support sand or the like when the unit is used for filtering, or granular ion exchange material when the unit is used for liquid treatment by ion exchange, all in a manner well-known to those skilled in the art.

A filter bottom according to my invention is simple and relatively inexpensive to construct and is not subject to corrosion or other maintenance difficulties. It presents smooth, streamlined surfaces to the liquid and it has no voids in which the liquid might remain stagnant. The volume of liquid in the passages of the bottom is held to a minimum which is particularly important when the apparatus is used in carrying out ion exchange reactions.

While I have shown a construction with a central header, it is, of course, possible to place the header at one side of the bottom so that then only one bottom slab need be formed. Other modifications may be made without departing from the spirit of my invention and reference is, therefore, made to the appended claims for a definition of the scope of my invention.

What I claim is:

1. A filter bottom comprising a monolithically cast concrete slab, a header adjacent to said slab, parallel horizontal passages of circular cross-section integrally cast in said slab and opening into said header, a plurality of rings spaced apart from each other and imbedded in said slab coaxial with each of said passages, ferrules imbedded in said slab, each of said ferrules being fastened to one of said rings and having a vertical passage extending from one of said horizontal passages to the top of said slab, and a strainer mounted at the top of each of said ferrules in communication with said vertical passage.

2. A filter bottom comprising two monolithically cast concrete slabs, a header between said slabs, parallel horizontal passages of circular cross-section integrally cast in each of said slabs and opening into said header, a plurality of ferrules imbedded in each of said slabs, each of said ferrules having a vertical passage extending from one of said horizontal passages to the top of said slabs, a third concrete slab covering said header and anchored to both said first named slabs, a plurality of ferrules imbedded in said third slab, each of said last named ferrules having a vertical passage extending from said header to the top of said third slab, and a strainer mounted at the top of each of said ferrules in communication with said vertical passage.

3. A filter bottom comprising two monolithically cast concrete slabs, a header between said slabs, parallel horizontal passages of circular cross-section integrally cast in each of said slabs and opening into said header, a plurality of rings spaced apart from each other and imbedded in said slabs co-axial with each of said passages, a plurality of ferrules imbedded in each of said slabs, each of said ferrules being fastened to one of said rings and having a vertical passage extending from one of said horizontal passages to the top of said slabs, plate means of asbestos cement covering said header, a third concrete slab resting on said plate means and anchored to both said first named slabs, a plurality of ferrules imbedded in said third slab, each of said last named ferrules being fastened to said plate means and having a vertical passage extending from said header to the top of said third slab, and a strainer mounted at the top of each of said ferrules in communication with said vertical passage.

4. A structure for constructing in a tank a filter bottom having imbedded therein a plurality of vertical ferrules and rings connected with the lower ends of said ferrules, which structure comprises a vertical form board having a plurality of horizontally spaced holes therein, rubber hoses extending through said holes and said rings parallel to each other and parallel to the bottom of said tank, a manifold connected with one end of each hose, the other end of each hose being closed, means for applying pressure to said manifold, and means for rigidly and detachably holding the upper ends of said ferrules.

DURANDO MILLER, JR.

References Cited in the file of this patent

UNITED STATES PATENTS

| Number | Name | Date |
|---|---|---|
| 651,391 | Sellers | June 12, 1900 |
| 1,114,013 | Millar | Oct. 20, 1914 |
| 1,277,832 | Beckley | Sept. 3, 1918 |
| 1,407,397 | Evans | Feb. 21, 1922 |
| 1,429,477 | Williamson | Sept. 19, 1922 |
| 1,569,896 | Tanner | Jan. 19, 1926 |
| 1,654,013 | Perrot | Dec. 27, 1927 |
| 1,708,421 | Henry | Apr. 9, 1929 |
| 1,949,650 | Lindas | Mar. 6, 1934 |
| 2,102,639 | Mourraille | Dec. 21, 1937 |

FOREIGN PATENTS

| Number | Country | Date |
|---|---|---|
| 13,947 | Great Britain | 1905 |
| 4,406 | Great Britain | 1912 |